United States Patent [19]

Kuhfuss

[11] Patent Number: 4,793,251

[45] Date of Patent: Dec. 27, 1988

[54] PROCESS AND APPARATUS FOR THE PROCESSING OF SECURITY-PAPER PRINTS AND IDENTIFICATION OF MISPRINTS

[75] Inventor: Runwalt Kuhfuss, Lausanne, Switzerland

[73] Assignee: De La Rue Giori S.A., Switzerland

[21] Appl. No.: 54,523

[22] Filed: May 27, 1987

[30] Foreign Application Priority Data

Jun. 6, 1986 [CH] Switzerland .......................... 2304/86

[51] Int. Cl.⁴ ........................ B41J 45/00; G06F 15/20; B41F 13/56

[52] U.S. Cl. ...................................... 101/93.01; 101/2; 101/79; 101/224; 101/240; 270/1.1; 271/258; 209/3.3; 209/548; 364/478; 53/399; 400/74

[58] Field of Search .................. 101/2, 93.01, 426, 76, 101/77, 79, 91, 92, 224, 226, 227, 232, 240, 228; 270/58, 1.1; 53/399; 209/3.3, 9, 569, 548, 552; 83/88; 400/74; 364/478; 235/232, 233; 271/258-263

[56] References Cited

U.S. PATENT DOCUMENTS 3,023,900 3/1962 Their .................................... 209/3.3
3,237,556 3/1966 Huffman ................................ 101/77
3,988,571 10/1976 Blair et al. ............................. 101/2
4,250,806 2/1981 Boyson et al. .......................... 101/2
4,527,468 7/1985 Piotruski ................................ 101/2
4,593,893 6/1986 Suter ...................................... 101/2
4,677,910 7/1987 Kuhfuss ............................ 101/93.01

*Primary Examiner*—Eugene H. Eickholt
*Attorney, Agent, or Firm*—Kane, Dalsimer, Sullivan, Kurucz, Levy, Eisele & Richard

[57] ABSTRACT

The print carriers which bear security-paper prints arranged in longitudinal and transverse rows and on which misprints are marked are numbered in such a way that all security-paper prints arranged in succession in a longitudinal row, but excluding misprints, receive a consecutive numerical sequence. Each longitudinal row contains security-paper prints of a specific numerical series. The print carriers are then cut into strips transversely relatively to the longitudinal rows. Approximately every 100 strips are stacked, in the order in which they occur, into a strip stack (T), in which all the security-paper prints arranged vertically on top of one another, if appropriate mixed with misprints, have a consecutive numerical sequence of a particular series. The strip stacks (T) are cut into security-paper bundles (U) which are sorted according to numerical series by means of a distributor station (10, 11*a*, 11*b*) and are fed to as many separate buffer stores (12A to 12F) as there are numerical series. All the buffer stores are followed by stations (13A to 13F) for separating out the misprints, stations (15*a* to 15*f*; 16*a* to 16*f*) for forming and banding bundles (V), each with 100 security papers, and stations (17A to 17F) for packaging each set of 10 bundles into security-paper parcels (W), all these stations operating in parallel and independently of one another.

9 Claims, 5 Drawing Sheets

PROCESS AND APPARATUS FOR THE PROCESSING OF SECURITY-PAPER PRINTS AND IDENTIFICATION OF MISPRINTS

FIELD OF THE INVENTION

The invention relates to a process and to an apparatus for the processing of print carriers printed with security-paper prints, in the form of security-paper webs or security-paper sheets, according to the preamble of claim 1.

PRIOR ART

A process of this type and an apparatus for carrying it out are described in U.S. Pat. No. 4,677,910. The particular feature of this known processing operation is essentially that the numbering units of the numbering machine are not moved on one number positively during each revolution of the numbering cylinder, but on the contrary are controlled as a function of the misprint positions, so that the incrementing of the numbering units is interrupted when a misprint appears. Consequently, only the perfect security-paper prints are numbered consecutively, so that the security-paper bundles, formed later after the print carriers have been cut and the misprints separated out, contain consecutively numbered individual security papers with a complete numerical sequence. Such a complete numerical sequence for the security papers contained in the packaged security-paper bundle is very important both for organizing production and distribution and for security reasons.

The print carriers, after leaving the numbering machine, have to be cut into individual security papers, the misprints separated out automatically, and finally the perfect security papers remaining sorted, bundled and banded in such a way that each bundle contains consecutively numbered security papers of the same numerical series. In general, each banded bundle contains 100 security papers, and each set of 10 bundles of the same numerical series is then combined into a parcel comprising a total of 1000 security papers, which must have a consecutive numerical sequence.

Appropriately, in a processing operation of this type, all the security-paper prints arranged in succession in one and the same particular longitudinal row receive a consecutive numerical sequence. By longitudinal rows are meant those rows which are parallel to the direction of advance of the print carrier when this runs through the numbering machine. Security-paper prints located in different longitudinal rows thus belong to different numerical series. When numbering of this kind is adopted, during subsequent sorting of the ready-cut security papers and after the elimination of the misprints all those security papers originally located in the same longitudinal rows of security-paper sheets or in one and the same longitudinal row as the security-paper web have to be combined into a common bundle or a common parcel.

In the processing of security-paper sheets, numbering can also be such that all the security-paper prints arranged next to one another in a transverse row, that is to say a row directed perpendicularly to the direction of advance during numbering, are provided with a consecutive numerical sequence which continues in the same corresponding row of the following sheet. In this case, when the security-paper bundles are formed, those security papers originally arranged next to one another in the same transverse rows of successive sheets must, of course, be collected in the correct order.

SUMMARY OF THE INVENTION

The object on which the present invention, relating to the processing steps following the numbering operation, is based is to carry out the cutting of the print carriers and the sorting and the collection of the security papers in such a way as to guarantee a simple, efficient and reliable work cycle which does not require any complicated processing stations susceptible to faults.

According to the invention, this object is achieved by means of the processes described in patent claim 1.

Expedient embodiments of the process, in the processing of security-paper sheets, emerge from patent claims 2 to 4 and, in the processing of security-paper webs, from patent claim 5. The number n is preferably approximately 100.

An apparatus for carrying out the process according to the invention is defined by the features indicated in patent claims 7 and 8.

The essential advantages of the invention are as follows:

Because the print carriers are first cut into individual strips and strip stacks are only then formed, there is no need to cut the strips individually into security papers and sort and collect the individual security papers obtained by as many stations accommodated next to one another in a confined space as there are security papers per strip. On the contrary, the strip stacks as a whole are cut into security-paper bundles, and the number n of strips forming a stack is selected so as to ensure that these stacks can be cut without difficulty by conventional cutting machines. Preferably, approximately 100 strips are collected to form each stack. In a security-paper bundle obtained, the consecutively numbered security papers coming from the original rows with a consecutive numerical sequence are arranged on top of one another, mixed with misprints, but in the correct numerical order.

Since, after the bundles are cut, the further processing of the security-paper bundles now takes place in parallel, that is to say the security papers of each numerical series are further processed separately in individual stations working in parallel, with a buffer store interposed in each case, there are no longer any problems associated with a single transfer line. There is sufficient room to accommodate the high-speed collecting stations, which process up to 16 security papers per second, and when a fault occurs in one of the individual stations it is not necessary to switch off the entire installation. The idea of processing the print carriers jointly, up to the point when strip stacks are cut into security-paper bundles, and only then sorting the bundles according to numerical series by means of a distributor station and processing them further in parallel therefore brings about substantial benefits.

Where the processing of security-paper webs is concerned, on which the security-paper prints in each longitudinal row are numbered consecutively, the web leaving the numbering machine is cut into strips transversely relative to the running direction by means of a cross cutter, and subsequently n strips, preferably approximately 100 strips, are collected into a strip stack which then travels to the bundle-cutting machine. This is unusual in the processing of security-paper webs, inasmuch as hitherto, in conventional processing, the webs are first cut into longitudinal strips by a longitudinal cutter, especially circular knives.

BRIEF DESCRIPTION OF THE DRAWINGS

The invention is explained in detail by means of two exemplary embodiments with reference to the drawings. In these.

DESCRIPTION OF THE PREFERRED EMBODIMENTS

Figure 1:
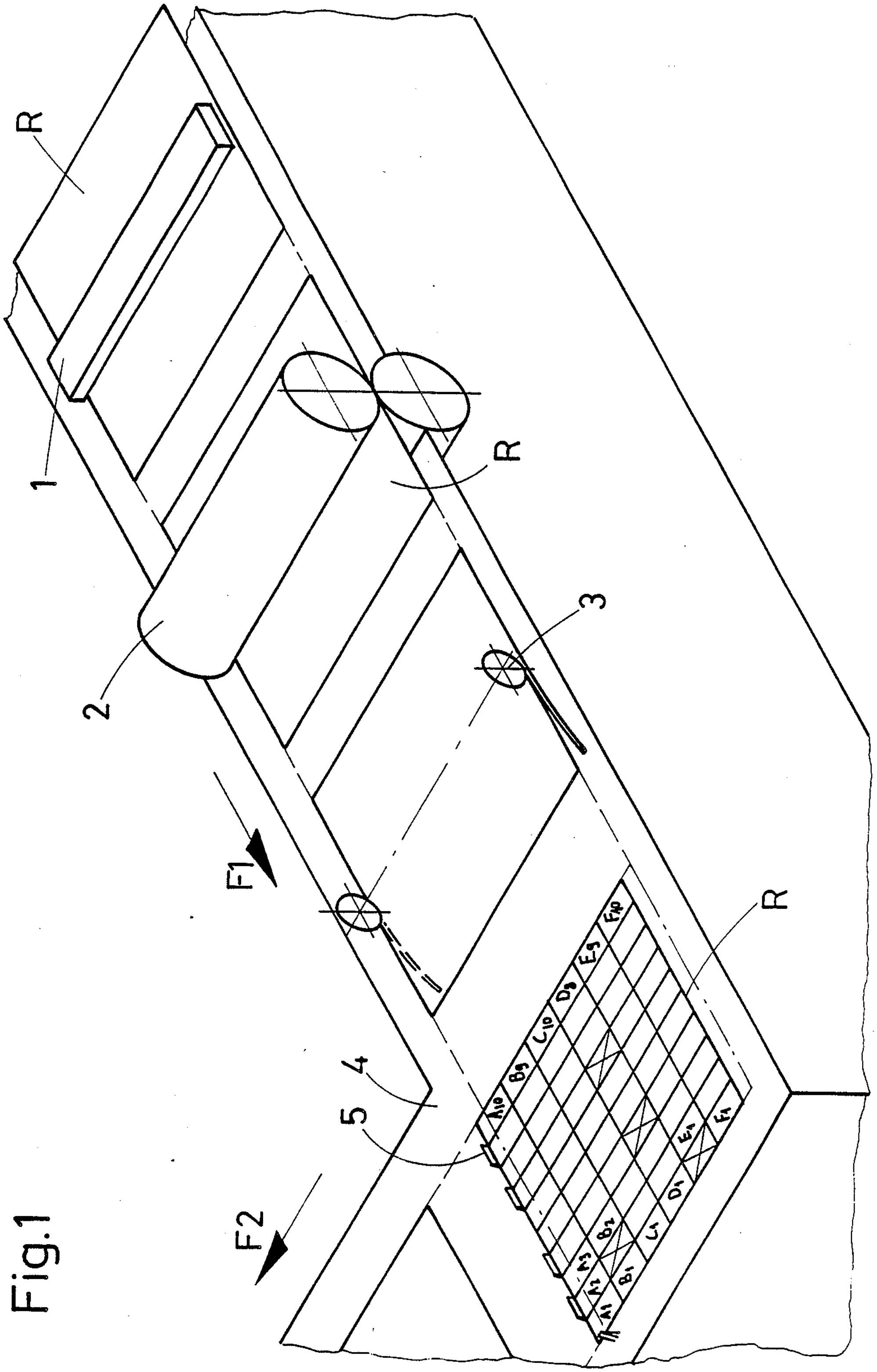
FIGS. 1 to 4 show diagrammatically the entire processing line for security-paper sheets, starting with the reader, which is installed in front of the numbering machine and which reads the misprint positions, up to the packaging stations for the security-paper parcels of each numerical series.

FIGS. 1 to 4 show the entire continuous apparatus for processing print carriers in the form of security-paper sheets R which are printed in matrix form with security-paper prints in longitudinal and transverse rows. As the result of a quality control, all the security-paper prints already detected as misprints bear a marking which is read by a reader 1 and which consists of a cross in the example under consideration (FIG. 1). The positions of all the misprints of a sheet R which are detected by the reader 1 are stored electronically, for example in a computer. The sheets R are numbered in a numbering machine 2 following the reader 1, then pass through an edge cutter 3 making the side edge cut, and then reach a corner station 4.

On the sheet R located at this corner station 4, four misprints marked with a cross and the numbering of the perfect security-paper prints, which, in the example under consideration, are arranged in six longitudinal rows and 10 transverse rows on each sheet, are indicated diagrammatically. By longitudinal rows are meant the rows oriented parallel to the direction of advance in the numbering machine 2, whilst the transverse rows are the rows running perpendicularly to this. Each sheet R thus contains $6\times10=60$ security-paper prints. Accordingly, the numbering machine 2 is equipped with 60 numbering units which are so adjusted and so moved on as a function of the stored misprint positions that, during each revolution of the cylinders of the numbering machine 2, the particular perfect security-paper prints arranged in succession in a longitudinal row, excluding the misprints, are numbered consecutively. All the security-paper prints arranged in a longitudinal row belong to a specific numerical series, and the number of different numerical series, designated by A, B, C, D, E and F, is of course equal to the number of longitudinal rows of a sheet R.

On the sheet R in question at the corner station 4, the security-paper prints in the longitudinal rows belonging to the series A, C and F and containing no misprints are numbered consecutively A1 to A10, C1 to C10, etc. The longitudinal rows belonging to the series B, D and E contain respectively one, two and one misprint, at which the incrementing of the particular numbering unit has been interrupted, so that only the perfect security-paper prints have been numbered consecutively. Consequently, the longitudinal row belonging to series B contains the security papers with the numbering B1 to B9, the longitudinal row belonging to series D contains the security papers with the numbering D1 to D8, and the longitudinal row belonging to series E contains the security papers with the numbering E1 to E9. On the following sheet, the numerical sequence of each longitudinal row continues correspondingly, so that, for example, the longitudinal row of the following sheet belonging to series A starts with the numbering A11.

In order reliably to prevent unauthorized use of the misprints to be separated out later, these misprints are also given a clear cancellation print by a cancellation printer at those points where the security-paper number is normally located. This cancellation printer, which is preferably arranged between the reader 1 and the numbering machine 2 and which is likewise controlled as a function of the stored misprint positions, is not shown in the drawing.

The above-described numbering method, the application of cancellation prints and the numbering machine and its special control are described in EP-A-0,167,196 mentioned in the introduction.

For further processing, the numbered sheets R are aligned at the corner station 4 by pressing them against stops 5 by means of their right-hand side edge, relative to the previous direction of transport according to the arrow F1, and then, after the stops 5 have been lowered, by conveying them further in the direction of transport according to the arrow F2, changed by 90°, for example by means of grabs or belts. The former longitudinal rows are now transverse relative to the new direction of transport.

In a strip-cutting station 6 equipped with circular knives (FIG. 2), each sheet R is divided into ten strips S parallel to the new direction of transport and at the same time is trimmed at its edges. The strip cut is thus made perpendicularly to the rows which contain the consecutively numbered security-paper prints of a numerical series. Each individual strip S therefore has as many security-paper prints as there are numerical series on a sheet, that is to say 6 in the example under consideration.

The strips S of a sheet, which are arranged next to one another, then enter a strip-collecting station 7. This has a device 7*a* for arranging the ten strips in an imbricated manner, these subsequently being pushed on top of one another in the direction of the two small arrows F3. In this strip group formed from ten strips S, all the consecutively numbered security-paper prints of one and the same numerical series, if appropriate mixed with misprints which occur, are arranged on top of one another in the correct numerical sequence. Thus, the bottom strip has the respective lowest numbers of the various numerical series.

Several strip groups of this type, which each contain the ten strips of a sheet and which advance in the direction of the arrow F4, are then stacked on top of one another, in the order in which they occur, by means of a stacking device 7*b*, to form a strip stack T. The number of strip groups forming a strip stack T is selected so that each strip stack T has a predetermined number n of strips, n being approximately 100. This is because a stack of approximately 100 strips can subsequently be cut into bundles without difficulty by a conventional cross cutter. Since, in the example under consideration, each sheet R is cut into ten strips S and therefore each strip group contains ten strips, every ten strip groups are combined into a strip stack which then contains exactly 100 strips. If the sheets had only eight transverse rows, that is to say if each strip group had only eight strips, then twelve collecting operations would be carried out in order to form a strip stack comprising $12 \times 8 = 96$ strips.

Figure 2:
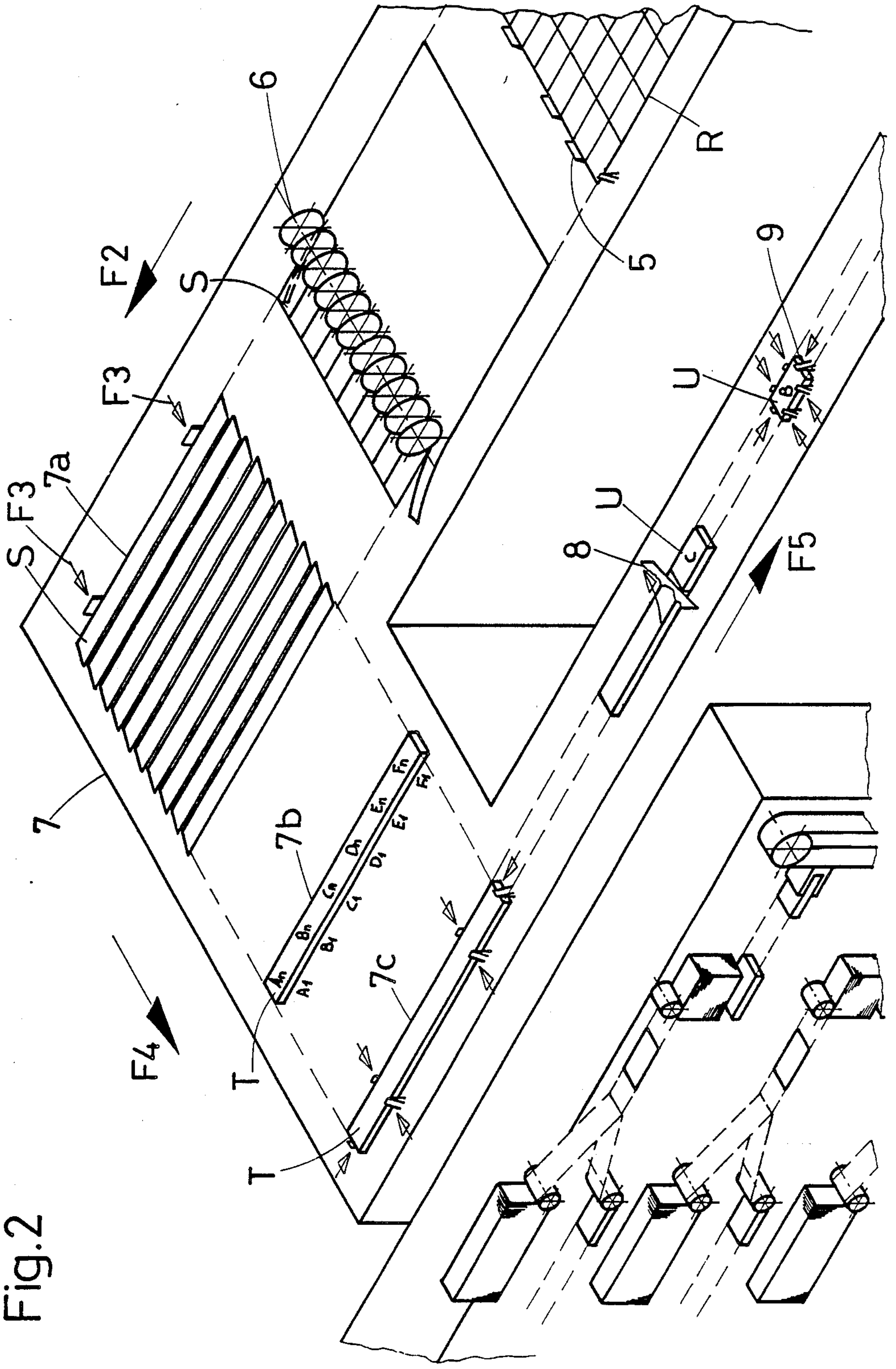

In each strip stack T, all the consecutively numbered security-paper prints, if appropriate mixed with misprints, are arranged on top of one another in the correct numerical sequence, and the lowest numbers, designated by A1, B1, . . . , F1 in FIG. 2, in each strip stack are at the bottom and the highest numbers, designated by An, Bn, . . . , Fn, are at the top. Each strip stack T is subsequently aligned exactly in a device 7*c*.

The strip stacks T are then conveyed in the direction of the arrow F5 and, in a bundle-cutting station 8 consisting of a conventional cross cutter, are cut successively into security-paper bundles U which are subsequently aligned in a station 9. Each security-paper bundle U contains solely consecutively numbered security papers belonging to one and the same numerical series A, B, . . . , F, as indicated by the lettering on the bundles in FIGS. 2 to 4.

After the direction of transport has changed by °, the security-paper bundles U pass onto a horizontal distributor station 10 (FIGS. 3 ano 4), on which they advance in the direction of the arrow F6 and are sorted according to numerical series. This is carried out by distributing successive bundles to as many individual stations working in parallel as there are numerical series, that is to say security-paper prints per strip. In the example under consideration, the number of security-paper prints per strip is $p = 6$.

In the example under consideration, this distribution is carried out by feeding groups of three successive bundles alternately to two vertical distributor stations 11*a* and 11*b*. The vertical distributor station 11*a* receives all the bundles with security papers of numerical series D, E and F, whilst the other vertical distributor station 11*b* receives all the bundles with security papers of numerical series A, B and C. Thus, all the bundles p are fed by these distributor stations 10, 11*a* and 11*b* to separate processing lines which each receive the security papers of one and the same numerical series and which operate in parallel and independently of one another. In the example under consideration, three of the processing lines following the distributor stations are arranged vertically above one another, so that the apparatus as a whole can be observed easily and is readily accessible.

Figure 3:
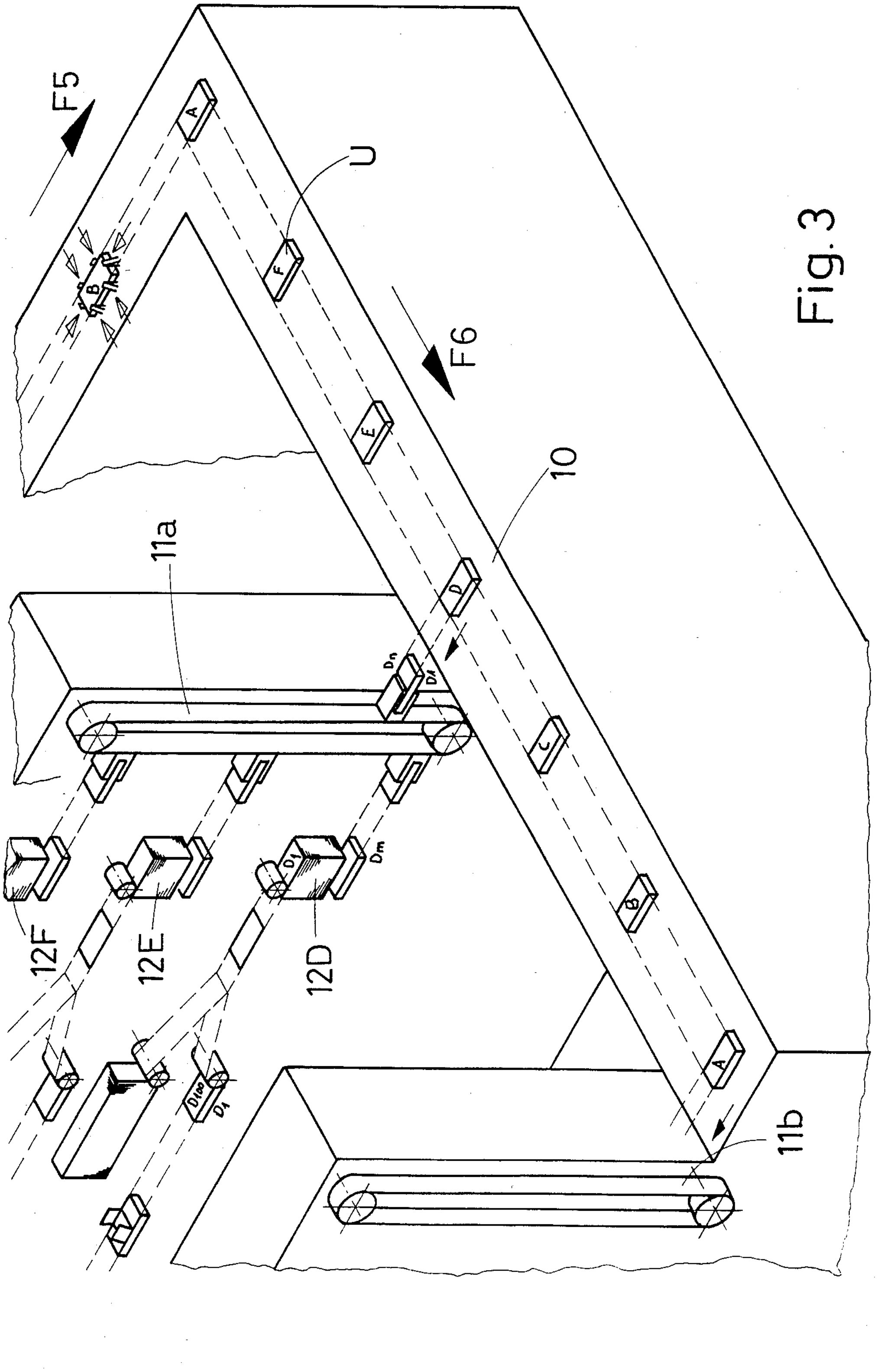
Figure 4:
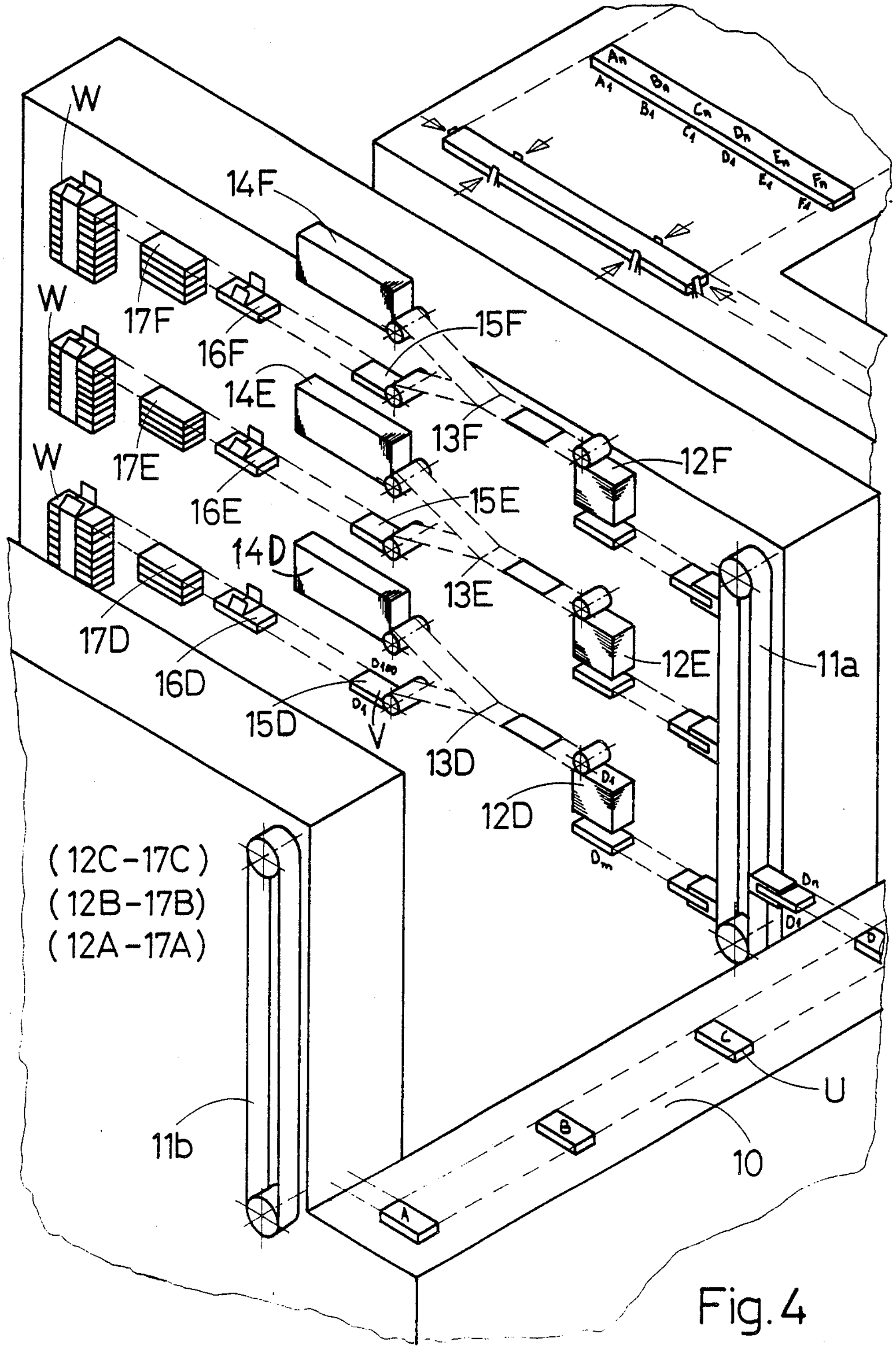

FIGS. 3 and 4 show merely diagrammatically the stations of the three processing lines which are located above one another and which follow the vertical distributor station 11*a* and further process the security papers with the numerical series D, E and F. The stations described below are therefore given reference symbols, to which the respective letters D, E and F are added. The three stations following the other vertical distributor station 11*b* and intended for the security papers of numerical series A, B and C are of exactly the same design and are therefore not shown in FIGS. 3 and 4; in FIG. 4, only the reference symbols of the respective stations are given in brackets. Only the processing stations which follow the vertical distributor station 11*a* are described below.

By means of this distributor station 11*a*, the bundles U of security papers of numerical series D, E and F are fed to the three separate buffer stores 12*d*, 12*e* and 12*f*. Each of these buffer stores can receive a relatively large number of security-paper bundles U, for example up to 1000 security papers, as indicated by D1 to Dm for the buffer store 12*d*.

In order to separate out the misprints, the security papers are extracted individually from each buffer store and sensed by ä detector (not shown) which signals the presence of a marking and which controls a station 13D, 13E or 13F for separating out the misprints. The misprints separated out pass into a storage container 14D, 14E or 14F, whilst the perfect security papers are stacked, in the bundling station 15D, 15E or 15F, into bundles V, each of 100 security papers. Since the correct numerical sequence of perfect security papers arranged on top of one another was maintained, during previous processing, both in the strip stacks T and in the security-paper bundles U, the security-paper bundles V now occurring are free of misprints and each contain 100 perfect, consecutively numbered security papers of a specific numerical series, as indicated by D1 to D100 for the bundle V of numerical series D.

These bundles V are then banded in a banding station 16D, 16E or 16F. Subsequently, in a packaging station 17D, 17E or 17F every ten bundles V are placed on top of one another, to form a security-paper parcel W which is packaged and which contains 1000 perfect security papers with a complete numerical sequence.

The abovementioned processing stations are of conventional design and are known.

Where sheet processing is concerned, the numbering can also be carried out by arranging the consecutively numbered security-paper prints in transverse rows, relative to the direction of advance during numbering. Each transverse row of a sheet then contains numbers of a specific numerical series. The numerical sequence of a row of the sheet then continues in the same row of the following sheet. In this case, the sheets leaving the numbering machine are cut into longitudinal strips, for example without a change in the direction of transport, by circular knives of a longitudinal cutter, whereupon the longitudinal strips of each sheet are arranged on top of one another, as in the collecting station 7, and a specific number of groups of strips arranged on top of one another are combined into a strip stack T which then undergoes the further processing described above.

Figure 5:
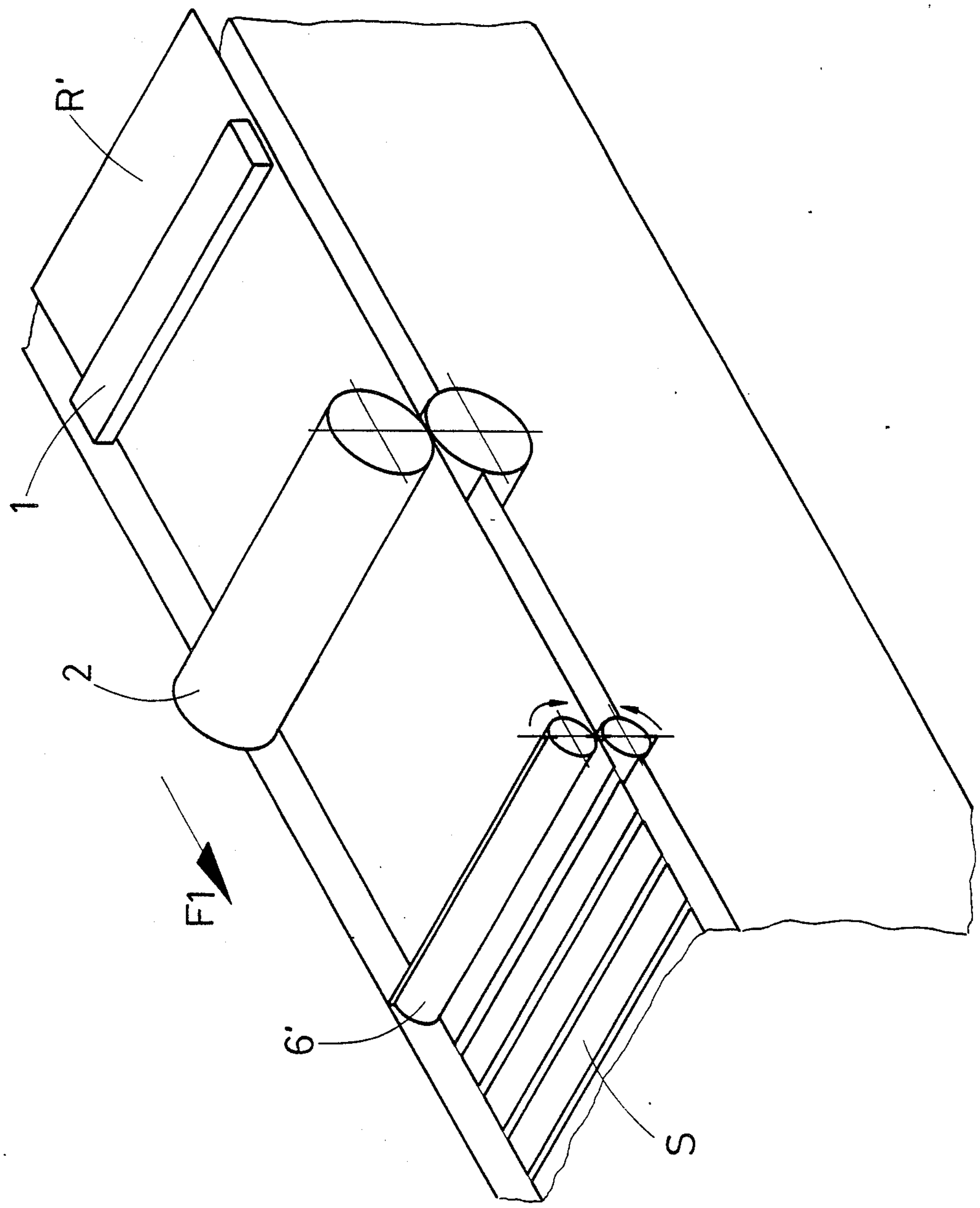
FIG. 5 shows diagrammatically the strip-cutting station for the processing of a security-paper web in a processing line which is otherwise of essentially the same design.

If the print carrier is a security-paper web R' printed by means of web-fed printing machines, security papers in each longitudinal row are numbered consecutively, and, as illustrated diagrammatically in FIG. 5, the web leaving the numbering machine 2 is cut into strips S by a cross cutter in a strip-cutting station 6'. Known interacting knife rollers are preferably used here. Then, n strips S are stacked in the order in which they occur, to form a strip stack which corresponds to the above-described strip stack T and which is further processed in the way described.

If a fault occurs in one of the processing lines following the vertical distributor stations 11*a* and 11*b*, only this particular processing line need be switched off until the fault is eliminated, whilst all the other stations of the apparatus as a whole continue to operate normally and the buffer store of the faulty processing line fills up.

The invention is not restricted to the exemplary embodiments described, but has many possible alternative forms as regards the design and arrangement of the individual stations.

I claim:

1. A process for the processing of print carriers in the form of security-paper sheets or security-paper webs, which are printed with security-paper prints and of which the security-paper prints are arranged in matrix form in transverse rows and longitudinal rows and the misprints are marked, into security-paper bundles composed of numbered individual security papers, in which process the positions of all the misprints on each print carrier are sensed by a reader and stored, the print carriers run successively through a numbering machine, the numbering units of which are controlled individually as a function of the stored misprint positions and carry out numbering of the security-paper prints in such a way that the particular security-paper prints arranged within a row receive a consecutive numerical sequence, but when a misprint occurs the incrementing of the respective numbering unit is interrupted and is continued only when the following perfect security-paper print appears, the numbered print carriers are cut into individual security papers, the marked misprints are separated out, and all the remaining consecutively numbered individual security papers coming from the same particular row are combined into security-paper parcels with a complete numerical sequence, wherein after numbering, the print carriers are cut, perpendicularly to the rows containing respective consecutively numbered security-paper prints, into as many strips as the print carrier has security-paper prints transverse relative to the cutting direction, a number n of particular cut strips is stacked, in the order in which they occur, into a strip stack, in which all the security-paper prints coming from one and the same row of consecutively numbered security-paper prints are arranged on top of one another in an ordered numerical sequence, if appropriate mixed with misprints, these strip stacks are cut into security-paper bundles of the correct size, a group of p successive security-paper bundles is distributed to p buffer stores working in parallel and collected there, p being equal to the number of security-paper prints on a strip, and subsequently the security papers from each buffer store are checked, in parallel, for any misprints, these misprints are separated out, and security-paper parcels, each with a complete numerical sequence, are formed from the remaining perfect security papers.

2. A process as claimed in claim 1, wherein, where security-paper sheets are concerned, all the strips obtained from a sheet and arranged next to one another after the strip-cutting operation are first placed on top of one another, to form a strip group, and then a specific number of successive strip groups are stacked to form the abovementioned strip stack.

3. A process as claimed in claim 2, wherein the strips arranged next to one another after the strip-cutting operation are first arranged in an imbricated manner and are then pushed on top of one another by being gathered together.

4. A process as claimed in claim 2 or 3, wherein all the particular security-paper prints arranged within a longitudinal row of a sheet oriented parallel to the running direction in the numbering machine are numbered consecutively.

5. A process as claimed in claim 4, wherein the running direction of the sheets leaving the numbering machine is changed by 90°, with the sheet orientation being maintained, and the cutting of the sheets into strips is carried out in a strip-cutting station in the new running direction by means of circular knives functioning as a longitudinal cutter.

6. A process as claimed in claim 1, wherein, where a security-paper web is concerned, all the particular security-paper prints arranged within a longitudinal row of the security-paper web oriented parallel to the running direction in the numbering machine are numbered consecutively, and in a strip-cutting station the numbered security-paper web is cut into strips transversely relative to the running direction by means of a cross cutter, of which a particular number n of successive strips is stacked into the abovementioned strip stack by arranging these strips preferably in an imbricated manner and then pushing them on top of one another.

7. A process as claimed in claim 1 wherein the number n is approximately 100.

8. An apparatus for carrying out the process as claimed in claim 1, with at least one reader for reading the positions of the marked misprints on each print carrier, a numbering machine designed to be controlled as a function of the read misprint positions and to number consecutively only the perfect security papers within a particular row, excluding misprints, strip-cutting and bundle-cutting stations for cutting the print carriers into individual security papers, a station for separating the misprints out of the transport sequence, and stations for forming and banding the perfect security-paper bundles and for forming and packaging security-paper parcels, wherein arranged between the strip-cutting station and the bundle-cutting station is a strip-collecting station designed to stack a specific number of strips into a strip stack in the order in which they occur, wherein a distributor station is arranged behind the bundle-cutting station, wherein the stations for separating out misprints and for forming and packaging security-paper parcels consist of several identical individual stations working in parallel, of which the number p is equal to the number of security-paper prints in a strip, and wherein a buffer store is arranged between the particular distributor station and each individual station for separating out misprints, p successive security-paper bundles being distributed to the p buffer stores.

9. An apparatus as claimed in claim 8, wherein the distributor station has a horizontal distributor station and several vertical distributor stations which are followed respectively by buffer stores arranged vertically above one another and individual stations.

* * * * *